(12) United States Patent
Li et al.

(10) Patent No.: US 10,924,031 B2
(45) Date of Patent: Feb. 16, 2021

(54) INTERNAL PARALLELED ACTIVE NEUTRAL POINT CLAMPED CONVERTER WITH LOGIC-BASED FLYING CAPACITOR VOLTAGE BALANCING

(71) Applicant: The Governors of the University of Alberta, Edmonton (CA)

(72) Inventors: Yunwei Li, Edmonton (CA); Zhongyi Quan, Edmonton (CA)

(73) Assignee: THE GOVERNORS OF THE UNIVERSITY OF ALBERTA, Edmonton (CA)

( * ) Notice: Subject to any disclaimer, the term of this patent is extended or adjusted under 35 U.S.C. 154(b) by 0 days.

(21) Appl. No.: 16/402,743

(22) Filed: May 3, 2019

(65) Prior Publication Data
US 2019/0363644 A1 Nov. 28, 2019

Related U.S. Application Data

(60) Provisional application No. 62/674,967, filed on May 22, 2018, provisional application No. 62/677,410, filed on May 29, 2018.

(51) Int. Cl.
*H02M 7/487* (2007.01)
*H02M 7/49* (2007.01)
*H02M 7/5387* (2007.01)

(52) U.S. Cl.
CPC ............. *H02M 7/487* (2013.01); *H02M 7/49* (2013.01); *H02M 7/5387* (2013.01)

(58) Field of Classification Search
CPC ....... H02M 7/487; H02M 7/49; H02M 7/5387
See application file for complete search history.

(56) References Cited

U.S. PATENT DOCUMENTS

| | | | | |
|---|---|---|---|---|
| 9,960,708 | B2 * | 5/2018 | Fu | H02M 7/53871 |
| 2015/0155712 | A1 * | 6/2015 | Mondal | H02J 3/1857 |
| | | | | 307/23 |
| 2015/0280608 | A1 * | 10/2015 | Yoscovich | H02M 7/537 |
| | | | | 363/131 |
| 2016/0329811 | A1 * | 11/2016 | Du | H02M 1/14 |
| 2018/0226879 | A1 * | 8/2018 | Wang | H02M 7/5395 |

FOREIGN PATENT DOCUMENTS

WO WO-2019204935 A1 * 10/2019 .......... H02M 7/5395

* cited by examiner

*Primary Examiner* — Gary L Laxton
(74) *Attorney, Agent, or Firm* — Blue Filament Law PLLC

(57) ABSTRACT

An internal parallelization based active neutral point clamped (IP-ANPC) converter is provided having a low switching frequency (LSF) part and a plurality of high switching frequency (HSF) modules. The HSF modules are connected in parallel and the converter is modular. The converter provides the benefits of modularity, improved reliability and efficiency, interleaving operation, and reasonable utilization of wide band gap (WBG) devices. A logic based flying capacitor voltage balancing scheme is also provided. The balancing scheme includes naturally balancing the voltage of the converter with phase shift pulse width modulation and redundantly balancing the voltage of the converter with redundant switching states.

20 Claims, 22 Drawing Sheets

INTERNAL PARALLELED ACTIVE NEUTRAL POINT CLAMPED CONVERTER WITH LOGIC-BASED FLYING CAPACITOR VOLTAGE BALANCING

CROSS-REFERENCE TO RELATED APPLICATION

This application claims priority of U.S. Provisional Patent Application Ser. No. 62/674,967 filed May 22, 2018 and U.S. Provisional Patent Application Ser. No. 62/677,410 filed May 29, 2018, which are incorporated herein by reference.

FIELD OF THE INVENTION

The present invention relates to an internal parallelization based active neutral point clamped (IP-ANPC) converter, and more particularly to a modular internal parallelization based active neutral point clamped (IP-ANPC) converter with flying capacitor voltage balancing.

BACKGROUND OF THE INVENTION

Multilevel converters have been widely applied in applications like high voltage DC transmission (HVDC), medium voltage (MV) and low voltage (LV) drives, and PV inverters. The foremost advantages of multilevel converters include reduced device voltage stress, improved output quality, better common mode voltage profile, system efficiency improvement, etc. With the penetration of wide band-gap (WBG) devices, i.e. Silicon Carbide (SiC) and Gallium Nitride (GaN), multilevel becomes even more favorable due to the following reasons. First of all, the WBG devices have limited voltage rating and series connection of WBG devices are challenging. Secondly, the dv/dt issue of WBG device poses challenges for overvoltage mitigation and noise suppression. With a multilevel converter, these challenges can be alleviated to a great extent. Conventionally, three-level (3L) converters, e.g. neutral point clamped (NPC) converter and T type NPC (TNPC), are popular choices. But to further improve the system performances, topologies with higher number of voltage levels are attractive. In general, increasing the number of voltage levels can improve the output quality and mitigate common mode voltage (CMV) as well as leakage current issues. Therefore, in recent years, intensive studies on high-level topologies, e.g. five-level (5L) and seven-level (7L), are reported in the literature (1).

Modularity has been favorable for reliability and economic considerations. Cascaded H-bridge (CHB) converter (2) and modular multilevel converter (MMC) (3) are good candidates in this category. However, both are more favorable for medium and high voltage applications. The bulky transformer and the unidirectional power flow make the CHB converter less attractive. As for the MMC, sub-module capacitor voltage balancing has been an issue for motor drive applications. Besides CHB and MMC, full DC link topologies like the flying capacitor based active neutral point clamped (FC-ANPC) converters (4, 5) have been proposed. However, these topologies are not modular in design.

In addition, paralleling several converters to achieve higher power capacity is a popular solution for many applications (6-8). First of all, parallelization offers modularity and fault tolerant capability. Secondly, the current rating of WBG devices will be much lower than that of the Silicon (Si) devices for a long time to come, and thus to reach higher power rating, parallelization becomes the only feasible solution. Thirdly, interleaving operation of the paralleled converters provides opportunities for output quality improvement, DC link current stress reduction, and CMV reduction (7-9). With the adoption of WBG devices and higher switching frequency, circulating current can be reduced, providing great opportunity for interleaving operation. Lastly, our recent study found that interleaving of higher-level converters produces lower circulating current (10). However, parallelization of high-level converters is seldom considered due to the concerns of undermined reliability due to high device count, and increased cost due to higher cost of WBG devices. In particular, a high-level converter fully built with WBG devices will be very costly, and thus paralleling of full-WBG converters becomes even less attractive.

Thus, there exists a need for a modularized and cost effective high-level multilevel converter topology concept that enables better utilization of WBG devices in high power applications. At the same time, as the switching frequency can be very high, an implicit but important requirement for WBG device-based topologies is that the modulation and control of the topology should be simple.

SUMMARY OF THE INVENTION

The present disclosure provides an internal parallelization based active neutral point clamped (IP-ANPC) converter that includes a low switching frequency (LSF) part and a plurality of high switching frequency (HSF) modules. The HSF modules are connected in parallel. According to embodiments, the converter includes an output filter. The converter is modular.

According to various embodiments the HSF modules each include a current sharing inductor. In some embodiments, each HSF module has a flying capacitor. The HSF modules may be synchronized. In further embodiments, each HSF module of the plurality of HSF modules is a half bridge HSF module. In embodiments, the HSF modules are interleaved.

According to embodiments of the present disclosure, voltage of the converter is balanced naturally with phase shift pulse width modulation. In various embodiments, voltage of the converter is redundantly balanced with redundant switching states.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE PREFERRED EMBODIMENTS

Figure 1A:
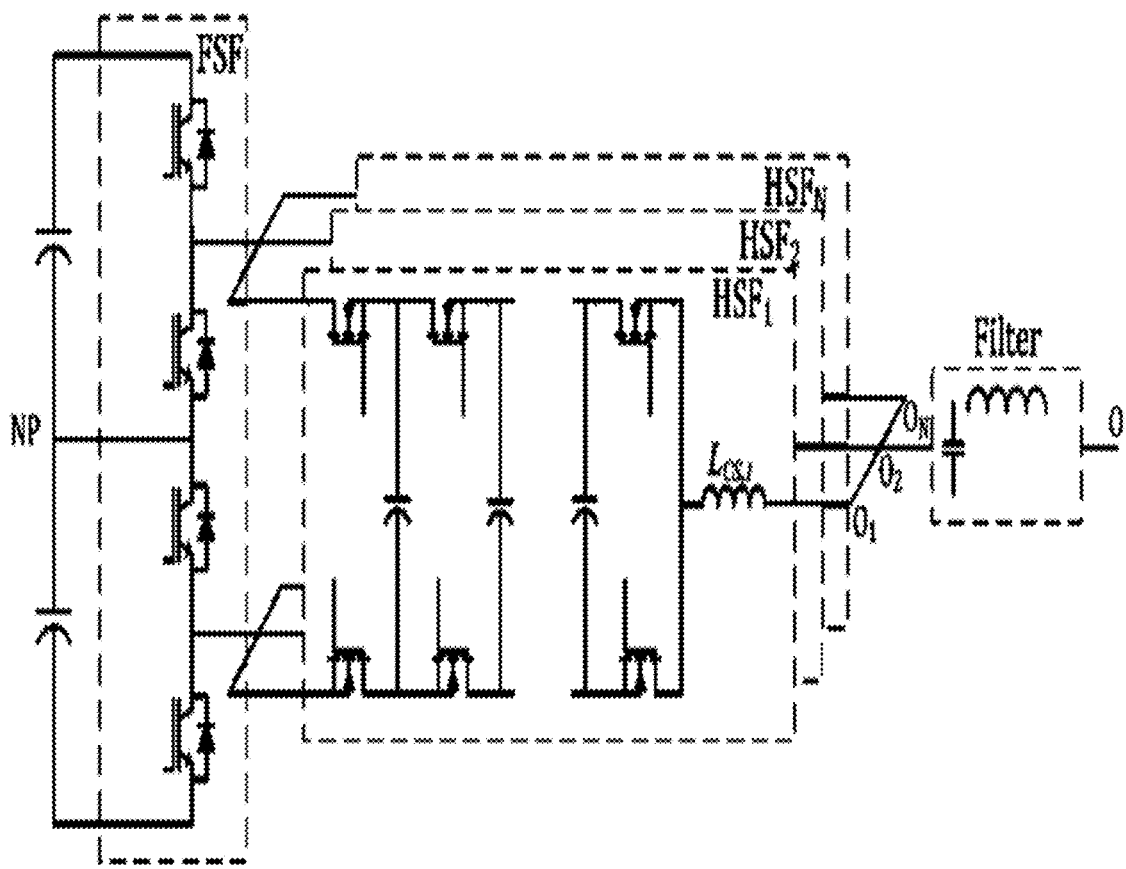
FIG. 1A is a schematic drawing showing one phase leg of a generalized IP-ANPC converter.

The present invention has utility as an internal parallelization based active neutral point clamped (IP-ANPC) converter that provides benefits of modularity, improved reliability and efficiency, interleaving operation. The present invention enables reasonable utilization of WBG devices or optimal combination of low-switching and high-switching semiconductor devices.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. It is important, therefore, that the claims be regarded as including such equivalent constructions insofar as they do not depart from the spirit and scope of the present invention. Also, it is to be understood that the phraseology and terminology employed herein are for the purpose of description and should not be regarded as limiting.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Figure 1B:
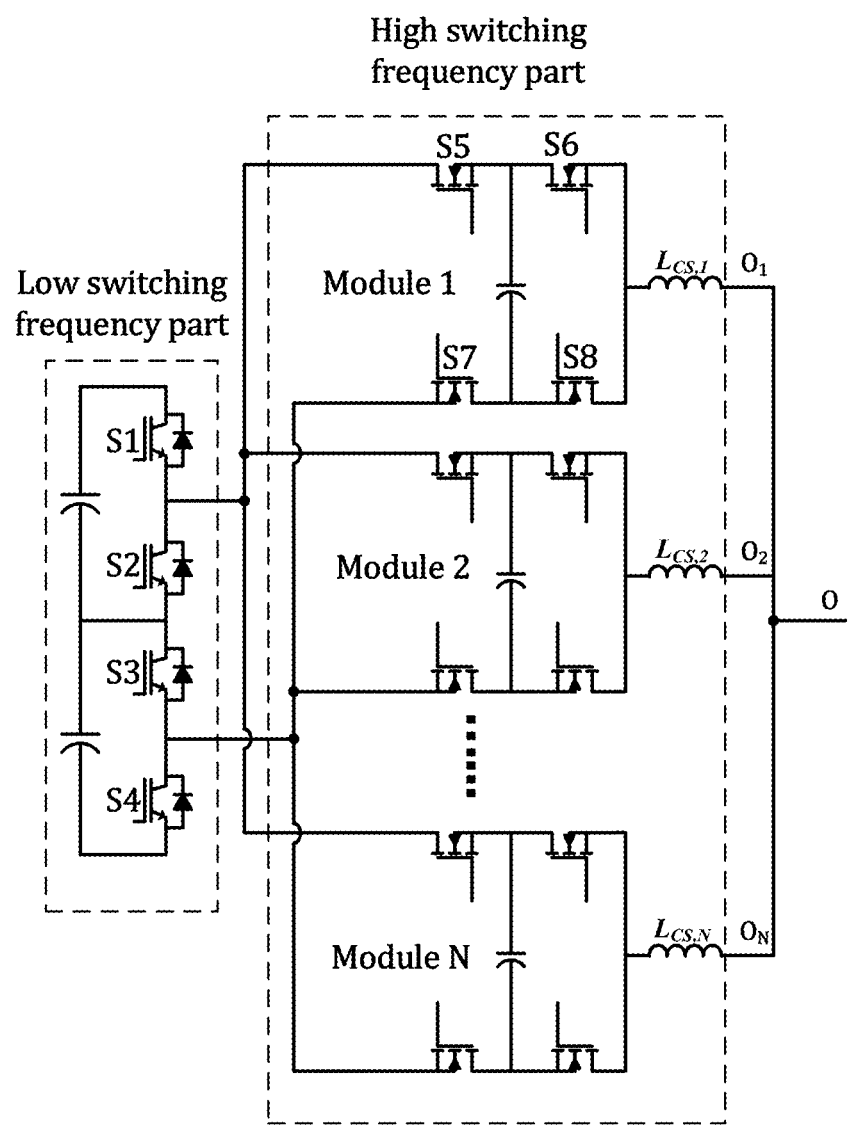
FIG. 1B is a schematic drawing showing an IP-ANPC with a single neutral point DC link type using single flying capacitor module, FC-IP-ANPC.
Figure 1C:
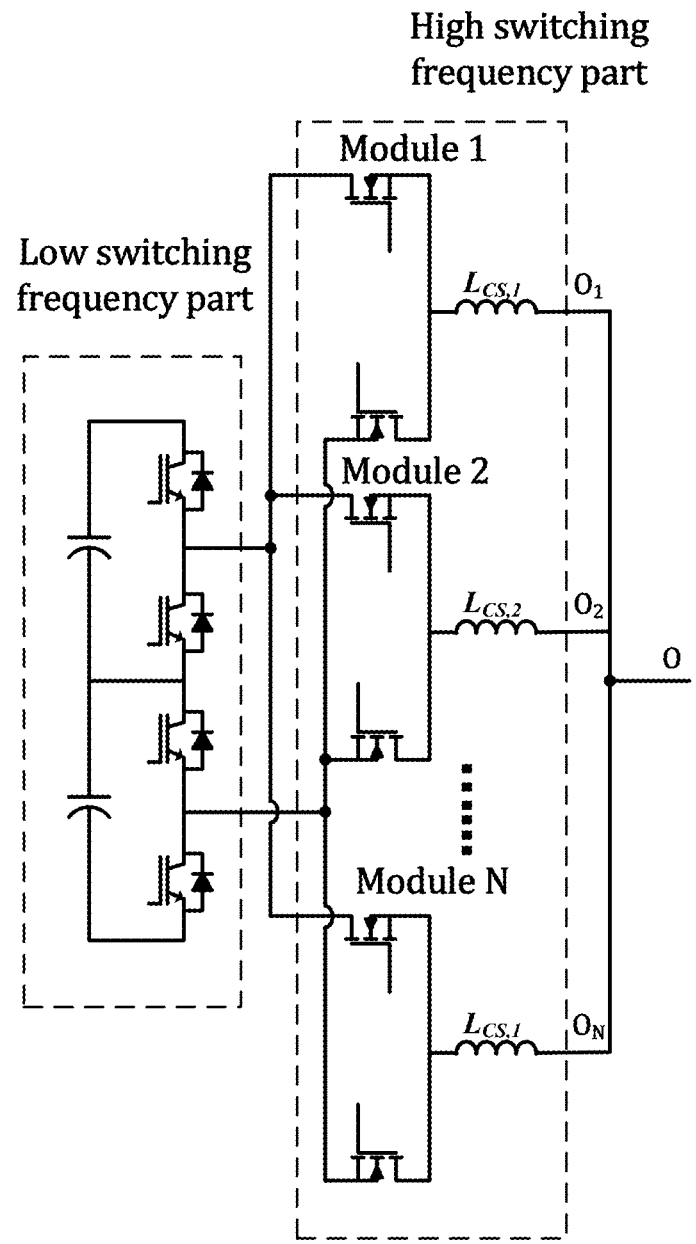
FIG. 1C is a schematic drawing showing an IP-ANPC with a single neutral point DC link type using a half-bridge module, HB-IP-ANPC.
Figure 2A:
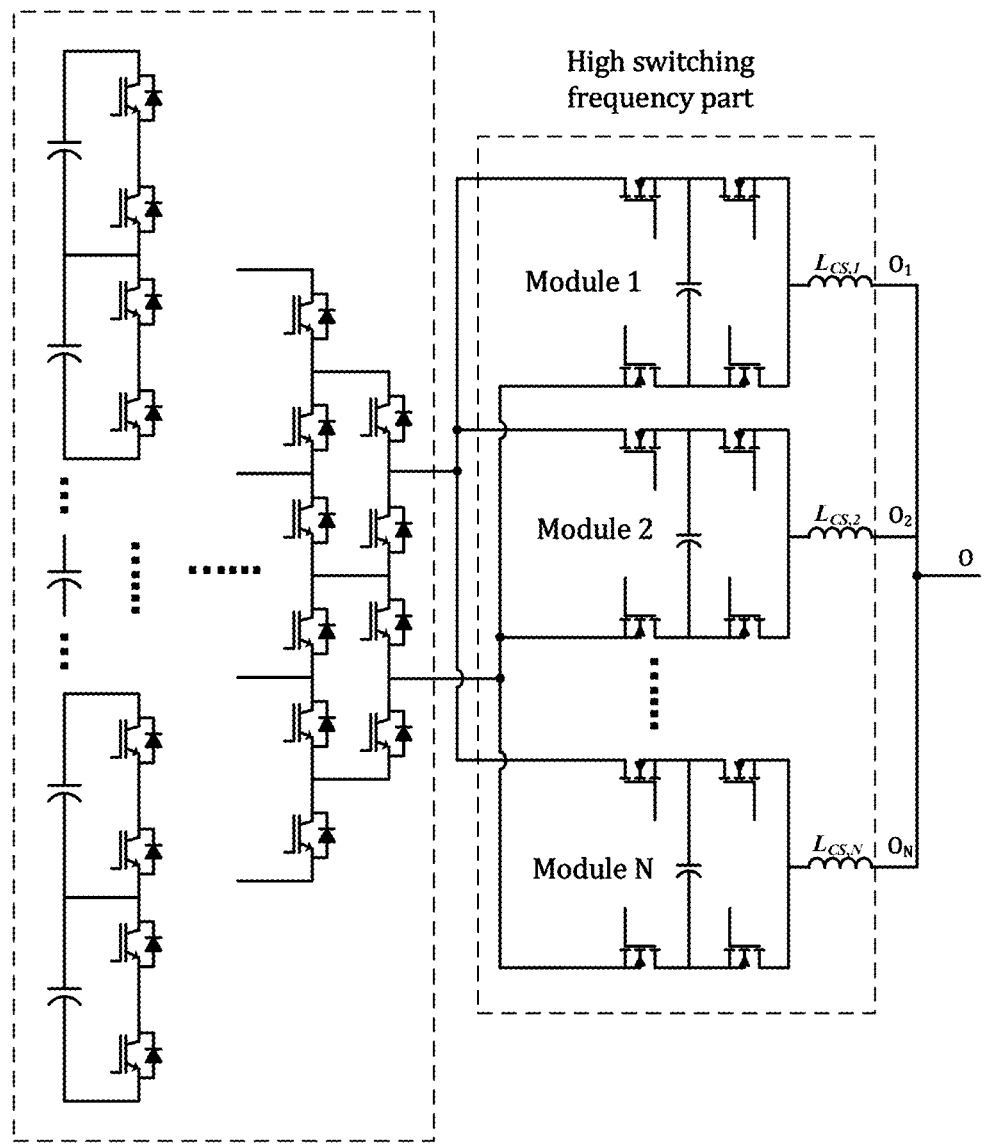
FIG. 2A is a schematic drawing showing IP-ANPC topology using HSF module with only one flying capacitor and multiple neutral points at DC link.
Figure 2B:
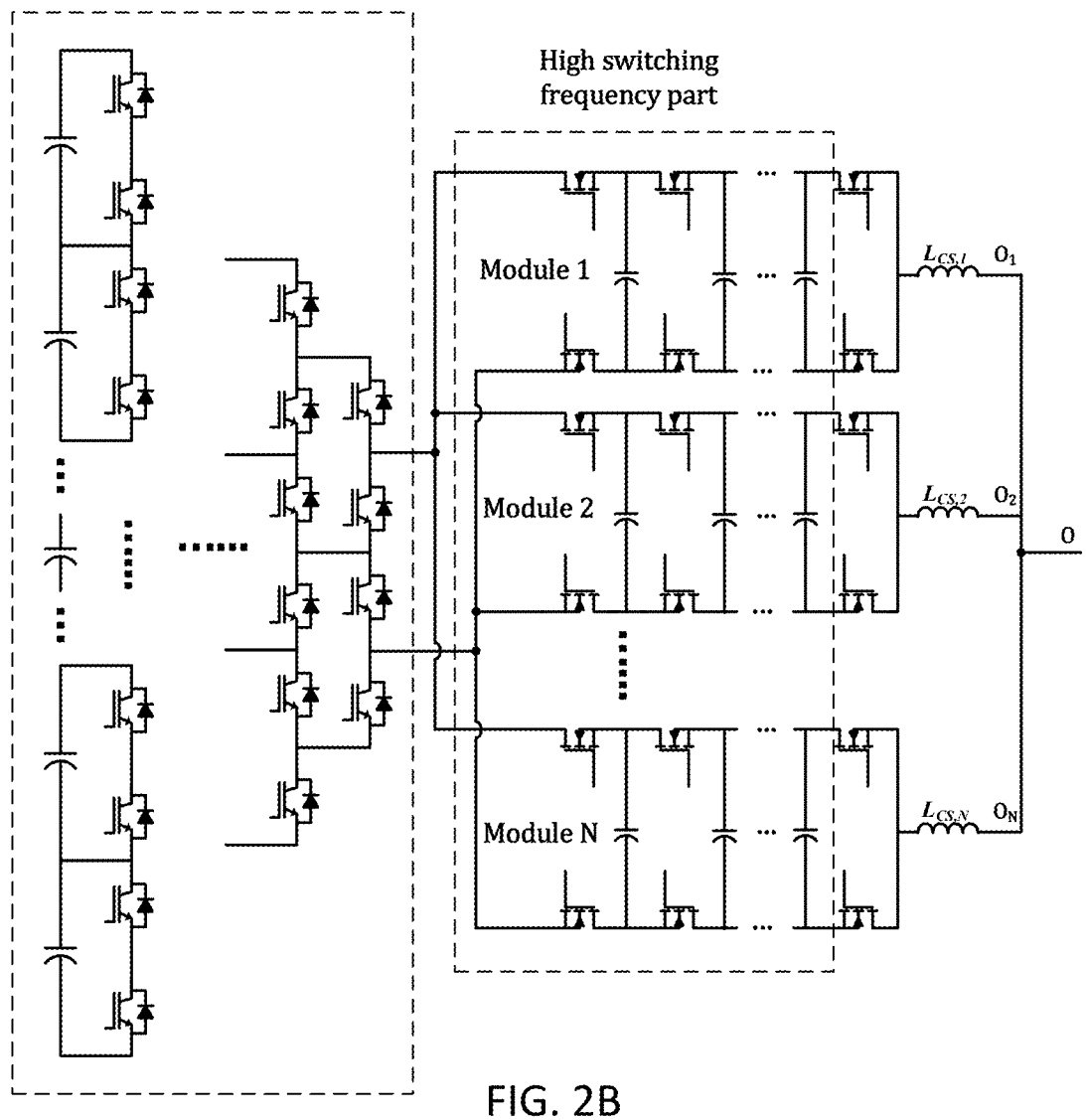
FIG. 2B is a schematic drawing showing IP-ANPC topology using HSF module with multiple flying capacitors and multiple neutral points at DC link.
Figure 2C:
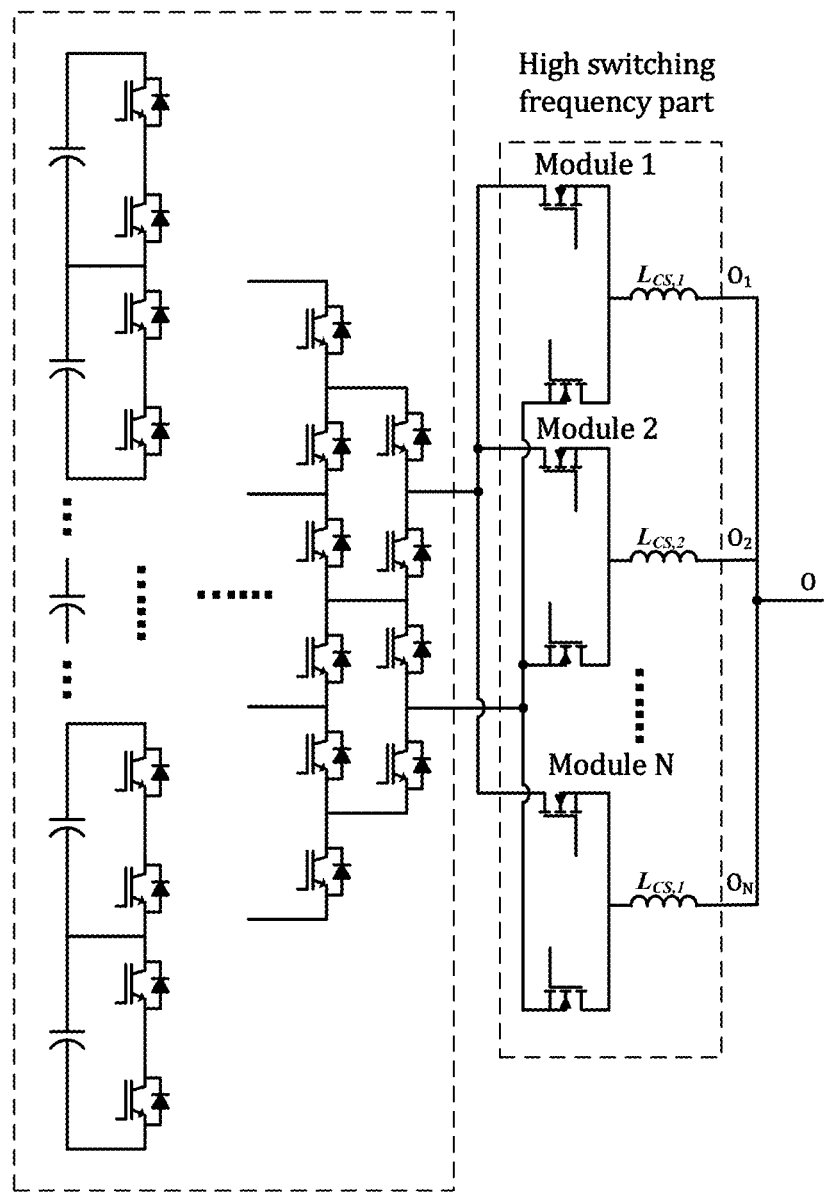
FIG. 2C is a schematic drawing showing IP-ANPC topology using half bridge modules and multiple neutral points at DC link.

The present disclosure provides internal parallelization based active neutral point clamped (IP-ANPC) topologies and IP-ANPC converters as shown generally in FIGS. 1A-1C. The architecture takes advantages of an interesting feature of the conventional ANPC topology, i.e. the topological decoupling of a low switching frequency (LSF) part and a high switching frequency (HSF) part. Therefore, several HSF modules can be paralleled and connected to the same LSF base module. By doing so, parallelization is realized without significantly increasing the device count, whereas the merits of parallelization, i.e. modularity and possible interleaving operation, are still retained.

The proposed topology provides an alternative solution for applications where parallelization is usually used, e.g. wind turbine generator and large scale PV plant. For applications like industry and traction drives where single converter is usually applied, the proposed topology can also be implemented due to the improvements in efficiency and reliability. Furthermore, with the IP-ANPC converter, WBG devices can be readily implemented in many high power applications with better device utilization. Finally, the interleaving operation of the paralleled HSF modules provides additional opportunity for realizing higher-level output voltage. In recent years, seeking high-level topologies based on 5L ANPC converter is becoming popular (11-13). However, none of the previous topologies are modular in design.

As shown in FIGS. 1A-1C, each topology includes a low switching frequency (LSF) part and several (N, N>=2) parallel-connected high switching frequency (HSF) modules. To prevent short circuit, each HSF module includes a current sharing inductor, which can also serve as (at least part of) an output filter. In the embodiment shown in FIG.

1B, each HSF module has one flying capacitor. The output voltage with this embodiment is 5-level if the HSF modules are synchronized and will be higher-level if the HSF modules are interleaved, e.g. 9-level when N=2, and 13-level when N=3. The embodiment shown in FIG. 1C utilizes half-bridge based HSF modules. If HSF modules are synchronized, the output is 3-level, but if interleaved, higher-level output can be generated, e.g. 5-level when N=2, and 7-level when N=3. The embodiments of the present disclosure realize higher-level output with only one neutral point (NP) in the DC link, and at the same time without using cascaded H-bridges (11) at the output. With only one DC link NP, the NP voltage can be self-balanced along the entire modulation index and power factor range. It also can be easily controlled. Moreover, without using cascaded H-bridges, the flying capacitor voltage (for the embodiment in FIG. 1B) can be self-balanced. Again, it also can be actively balanced for protection purpose. A fast and simple active balancing method is also provided by the present disclosure. The above advantages can significantly increase the operation reliability and reduce the control complexity of the system, making them attractive for WBG devices. Another advantage of the IP-ANPC topologies is that the system reliability can be improved as compared to conventional converter parallelization. With a backup HSF module, the system reliability can be extremely high, which is attractive for critical applications.

According to embodiments of the present disclosure, the HSF modules in the IP-ANPC converter are identically designed, making the topology modularized. This inherent modularity facilitates the design of the system and meanwhile enables the fault tolerant capability. In addition, the HSF modules are designed with partial power, which allows a device with lower current rating, and thus lower cost, to be used and alleviating the pressure of manufacture, maintenance, and repair.

Figure 3:
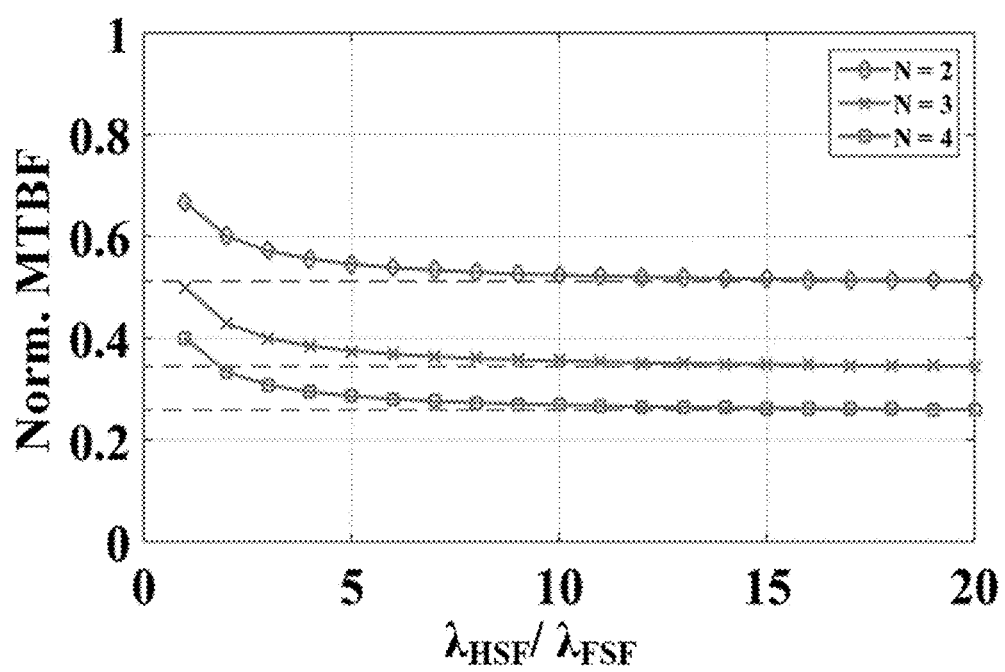
FIG. 3. Is a graph showing normalized MTBF value with different number of paralleled HSF modules.

As for reliability, the reliability of a system has an inverse relationship with the number of installed device. Typically, parallelization undermines the reliability of the system. This is particularly important for multilevel converters as they usually have higher device count. This problem is alleviated with the IP-ANPC architecture. FIG. 3 shows the Mean Time Between Failures (MTBF) value (normalized to single 5L ANPC converter) with respect to the ratio of the failure rate between HSF module and LSF module ($\lambda_{HSF}/\lambda_{LSF}$). The MTBF is calculated based on Equation 1. In FIG. 3, the dashed lines show the reliability of paralleled 5L ANPC converters, with the various shaped lines indicating the number of converters as shown in the legend. As shown, the IP-ANPC is more reliable than the paralleled converters. Note that with practical considerations, the ratio between the failure rates of HSF module and LSF module is usually within 5 (12), which indicates that the improvement brought by IP-ANPC topology is significant.

$$MTBF_{IP} = \frac{1}{12\lambda_{FSF} + N(12\lambda_{HSF})} \qquad \text{Equation 1}$$

Figure 4:
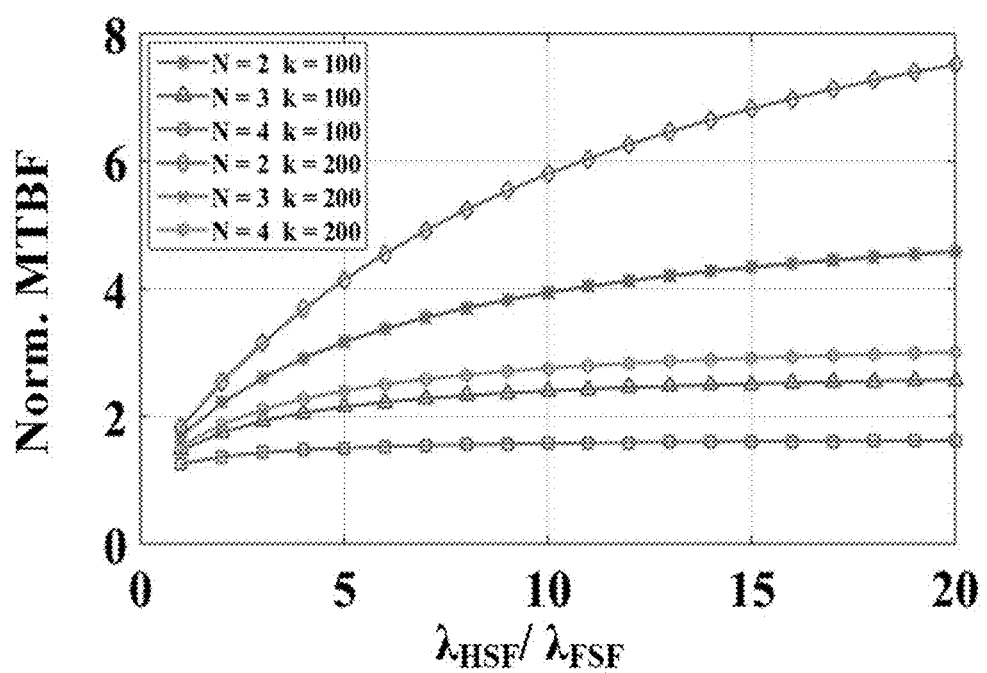
FIG. 4 is a graph showing normalized MTBF value with additional installed HSF module with the value N indicating that the actual installed number of HSF modules is N+1.

In addition, with each additionally installed HSF module, i.e. N+1 strategy, the reliability is increased as compared to non-modular designs. The normalized MTBF with additional HSF modules, calculated based on Equation 2, is shown in FIG. 4. Note that the repair rate μ of the HSF module is considered in the calculation. It is clear to see that with additional installed HSF modules, the reliability of the system can be much higher than that of the single converter system. The variable k in FIG. 4 denotes the ratio between $\mu_{HSF}$ and $\lambda_{HSF}$. With more HSF modules in parallel, the value of k is increased as repairing is easier with modular design.

$$MTBF_{IP,N+1} = \frac{1}{12\lambda_{FSF} + \dfrac{N(N+1)144\lambda_{HSF}^2}{(2N+1)\lambda_{HSF} + \mu_{HSF}}} \qquad \text{Equation 2}$$

Parallelization is an effective way to reduce the total switching loss of the system (12). However, it is difficult to reduce conduction loss, which is proportional to current rating. For an IGBT device with anti-parallel diode, the conduction loss is calculated based on Equation 3 for the switching and based on Equation 4 for the diode. Two IGBT modules with different current ratings but the same technology will have very similar $V_{CE0}$ and $V_{F0}$. However, the on-state resistance ($R_C$ and $R_F$) is in general inversely proportional to the current rating. Therefore, for the same total current, the total conduction loss of two low current rating devices will be very close to that of one high current rating device. That said, parallelization generally does not reduce the total conduction loss of the system.

$$P_{Con,IGBT} = V_{CE0}I_{C,Avg} + R_C I_{C,RMS}^2 \qquad \text{Equation 3:}$$

$$P_{Con,Diode} = V_{F0}I_{D,Avg} + R_F I_{D,RMS}^2 \qquad \text{Equation 4:}$$

For an IP-ANPC converter according to the present disclosure, the LSF devices are dominated by conduction loss as their switching losses are negligible. However, the HSF devices are dominated by switching losses due to the required high switching frequency. Therefore, parallelization of LSF module is actually unnecessary as it provides no further efficiency improvement. However, the parallelization of HSF modules can be a benefit.

The IP-ANPC topology is particularly attractive for WBG devices. Due to the limited voltage (~1.7 kV) and current rating (~300A), the WBG devices are not readily applied for many high power applications with conventional solutions, e.g. the traction drives in high-speed rail (HSR), megawatt scale 1.5 kV large scale PV inverter, and multi-megawatt wind turbine. These applications require not only high blocking voltage, but also high current rating, both of which are limited in WBG devices. Hence, Si IGBT based 2L converters will be still prevailing in industry. However, with the inventive IP-ANPC topology, the Si IGBT can be used to construct the LSF modules, while WBG devices can be implemented in HSF modules. As such, the voltage stress on the WBG devices is reduced as compared to conventional 3L topologies. The parallelization of HSF modules can reduce the current stress and total switching losses of the WBG devices. Also, the high switching capability of WBG in turn reduces the size of flying capacitor and current sharing inductors. As high switching frequency and high-level output can significantly reduce the size of input/output filters, the power density (Power/Volume) and power weight (Power/Mass) of the entire system can be substantially increased.

Figure 5:
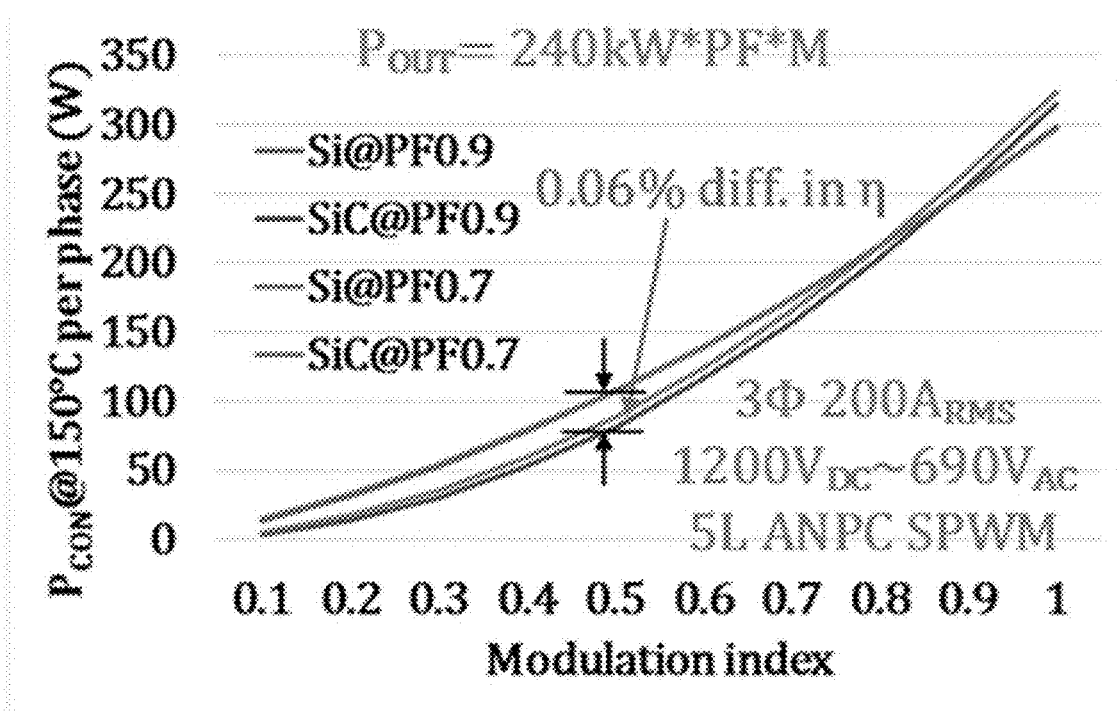
FIG. 5 is a graph showing simulated conduction loss of LSF devices per phase.

According to embodiments of the present disclosure, Si IGBT is used as the LSF devices. Si IGBT has much higher voltage and current rating than the state-of-the-art WBG devices. Therefore, for many applications, there are no WBG devices available for LSF module design. Secondly, the benefit of switching loss reduction with WBG device cannot be reflected in an LSF module. Nevertheless, the conduction loss of Si IGBT and WBG devices are actually very similar. In heavy a load condition, the conduction loss with Si IGBT is even lower. Table I shows two selected devices for comparison of conduction loss. Both are 1.2 kV and 300A rated. A simulation is conducted based on a 240 kVA three-phase 5L ANPC converter with 1.2 kV DC link voltage and 690V AC output. Constant impedance load is used such that the output current is proportional to the modulation index. The simulated conduction loss per phase is shown in FIG. 5. One can see that the maximum difference only accounts for a negligible 0.06% difference in the efficiency of the system. In heavy load condition, the conduction loss with Si IGBT is even lower.

TABLE I

Device parameters at junction temperature of 150° C.

| Model | Type | $v_{CE0}$ | $R_C/R_{ds,\,on}$ |
|---|---|---|---|
| FF300R12KT4P | Si | 0.7 V | 4.3 mΩ |
| CAS300M12BM2 | SiC | N/A | 7.7 mΩ |

Therefore, it is reasonable to implement Si IGBT as LSF devices. The cost of the system can also be reduced as Si IGBT has a much lower cost than WBG devices. Also, as the current rating of Si IGBT is much higher than that of WBG devices, using IP-ANPC topology becomes a favorable solution as paralleling of several LSF module is quite unnecessary. In addition, the number of installed WBG devices in the IP-ANPC topology is the same or less as compared to the state-of-the-art full WBG 3L converters. With the benefits of 5L ANPC, WBG device voltage stress can also be reduced. As the $R_{ds,on}$ of WBG devices scales with the square of rated blocking voltage (per chip area), expressed as $$R_{ds,on} = \frac{4V_B^2}{\varepsilon_S \mu_n E_C^3},$$

where $V_B$ is the rated blocking voltage of the device, $\varepsilon_S \mu_n E_C^3$ is a material characteristics related constant. The reduction of voltage stress can further lead to improvement of efficiency.

The application of IP-ANPC is not limited to constructing HSF modules with WBG devices. For high power applications like multi-megawatt motor drives or full-scale wind turbine generator drives, IP-ANPC can be implemented with Gate Turn Off (GTO) thyristor or Integrated Gate-Commutated Thyristor (IGCT) as LSF devices and IGBT as HSF devices. This enable the best combination of different semiconductor devices, while maintaining all the advantages as of the IP-ANPC converter.

Interleaving is an effective way to increase the number of output voltage levels. Such interleaving can be series type, i.e. flying capacitor converter or parallel type, i.e. interleaved converter through current sharing inductors (14). With series type, many capacitors are required, whereas higher volume of inductors are required in parallel interleaving in order to suppress the circulating current. Hybrid series-parallel interleaving with interleaved flying capacitor converters is a good alternative, as interleaved multilevel converters tend to have lower circulating current as compared to interleaved 2L converters (10). But as aforementioned, high device count leads to reliability degradation.

The inventive IP-ANPC topology provides a new solution for hybrid series-parallel interleaving with lower device count, and thus higher reliability. In the following context, simulation results are presented using the system specs in Table II.

TABLE II

System specifications

| Parameter | Value |
|---|---|
| DC link voltage | 1200 V |
| Carrier frequency | 3000 Hz |
| Current sharing inductance | 50 uH for SO mode; 2.5 mH for IO mode |
| Flying capacitor capacitance | 100 uF |
| No. of HSF modules | 2 |
| Load parameters | 690 V/50 kW |

Figure 6A:
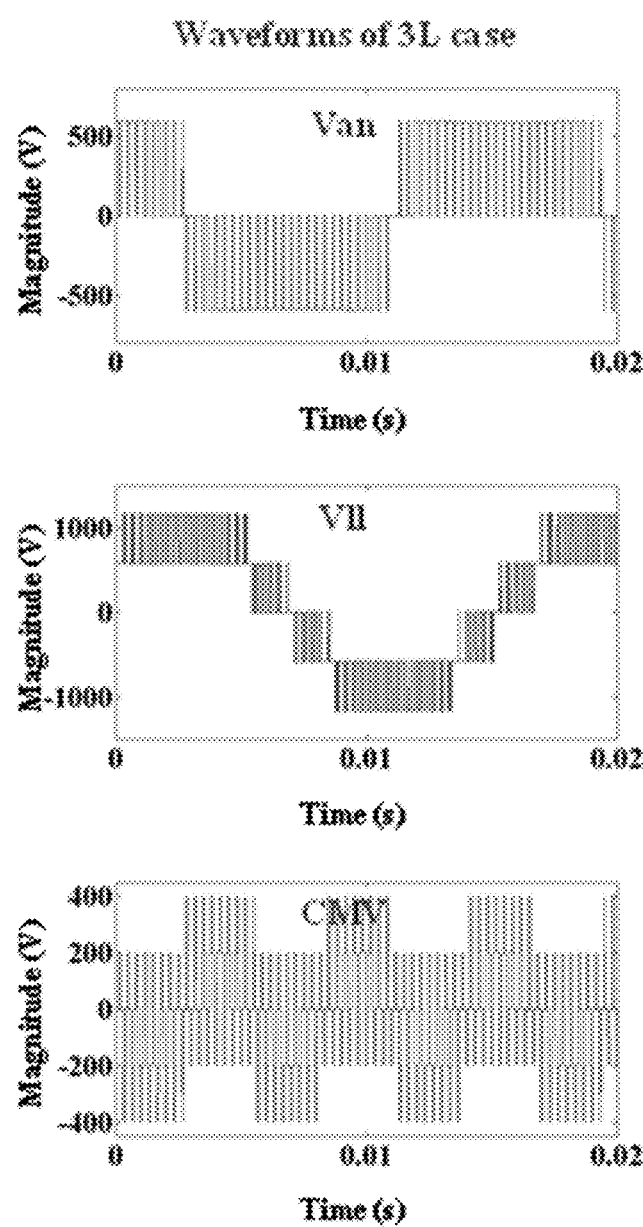
FIG. 6A is a series of graphs showing phase voltage (Van), line-to-line voltage (Vll), and common mode voltage (CMV) waveforms of the embodiment of FIG. 1C with two HSF modules in an SO operation mode for HB-IP-ANPC.
Figure 6B:
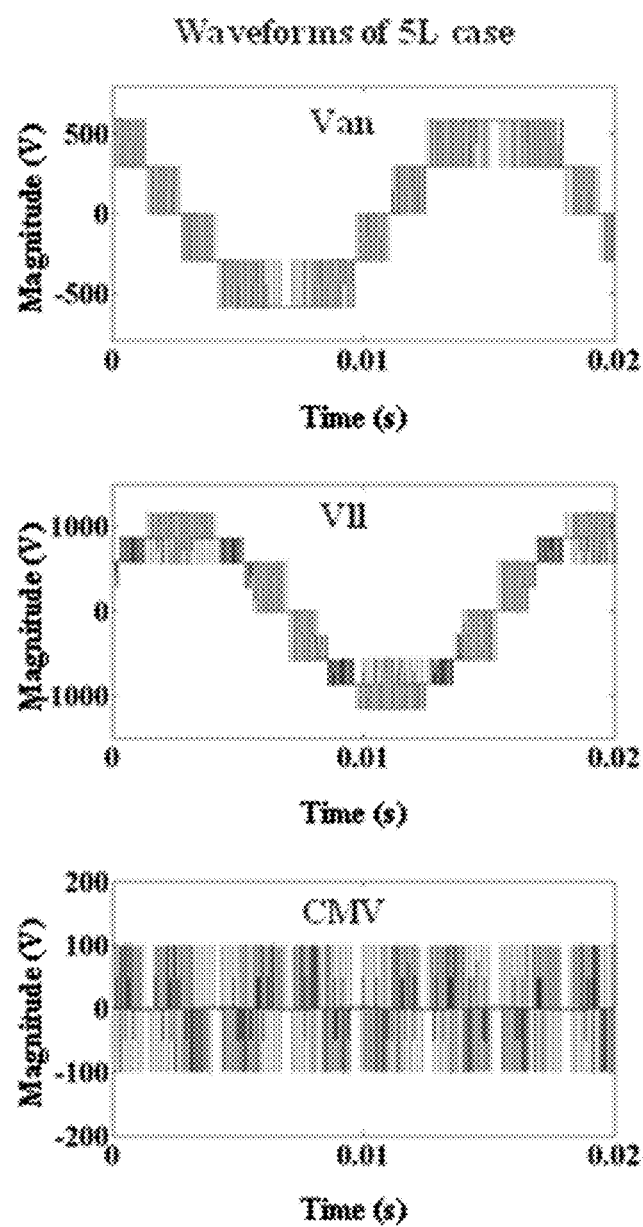
FIG. 6B is a series of graphs showing phase voltage (Van), line-to-line voltage (Vll), and common mode voltage (CMV) waveforms with two HSF modules in an IO operation mode for HB-IP-ANPC of FIG. 1C and SO mode for FC-IP-ANPC of FIG. 1B.
Figure 6C:
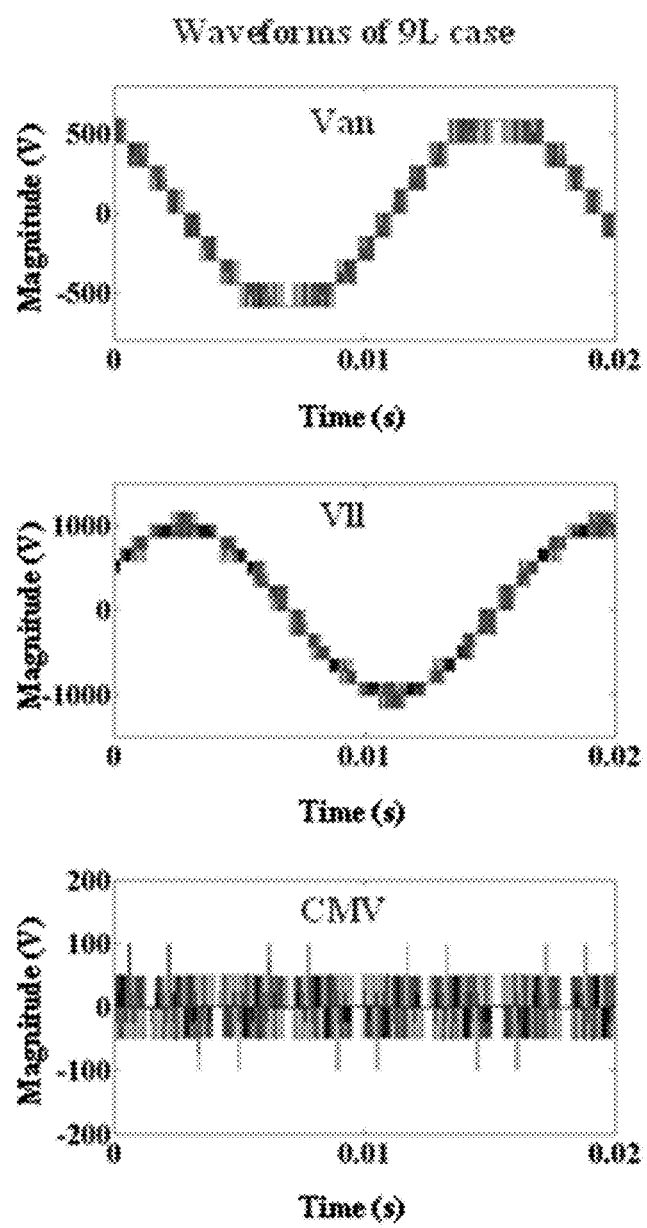
FIG. 6C is a series of graphs showing phase voltage (Van), line-to-line voltage (Vll), and common mode voltage (CMV) waveforms of the embodiment of FIG. 1B with two HSF modules in an IO operation mode for FC-IP-ANPC.
Figure 7A:
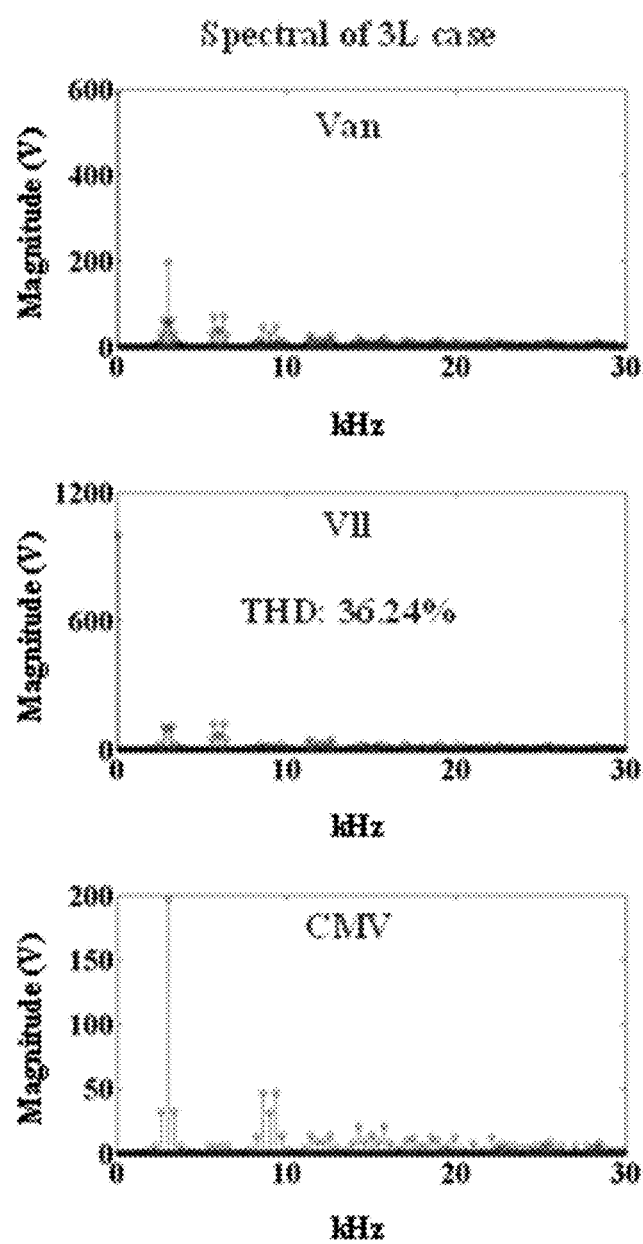
FIG. 7A is a series of graphs showing Harmonic spectral of the waveforms in an SO operation mode for HB-IP-ANPC.
Figure 7B:
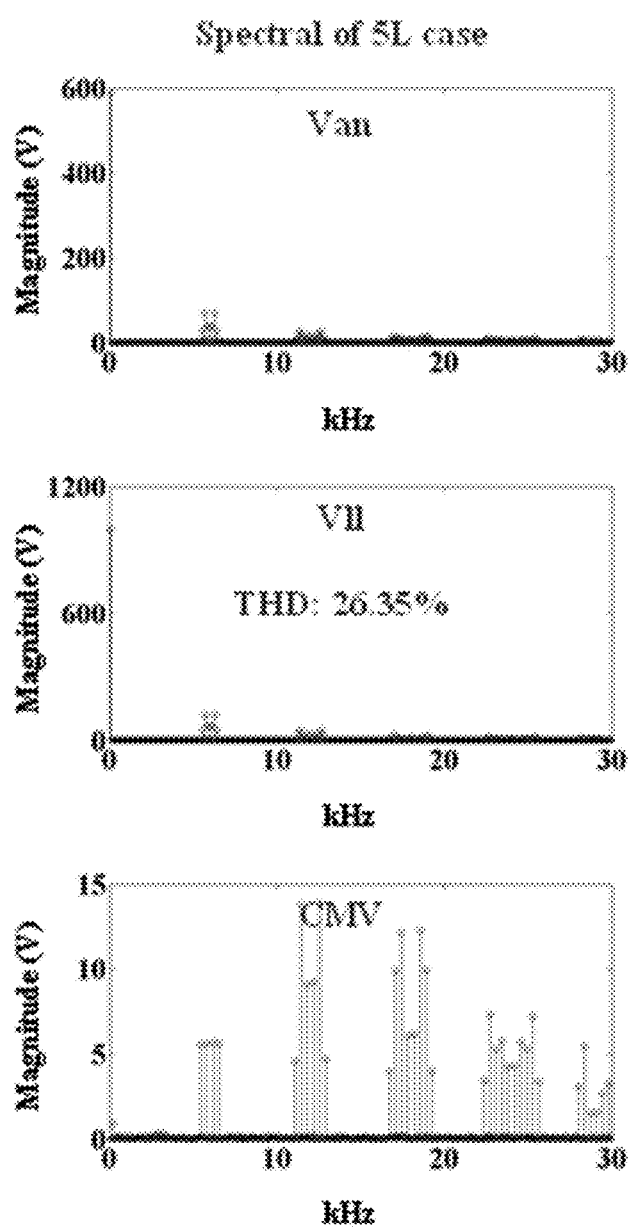
FIG. 7B is a series of graphs showing Harmonic spectral of the waveforms in an IO operation mode for HB-IP-ANPC and an SO operation mode for FC-IP-ANPC.
Figure 7C:
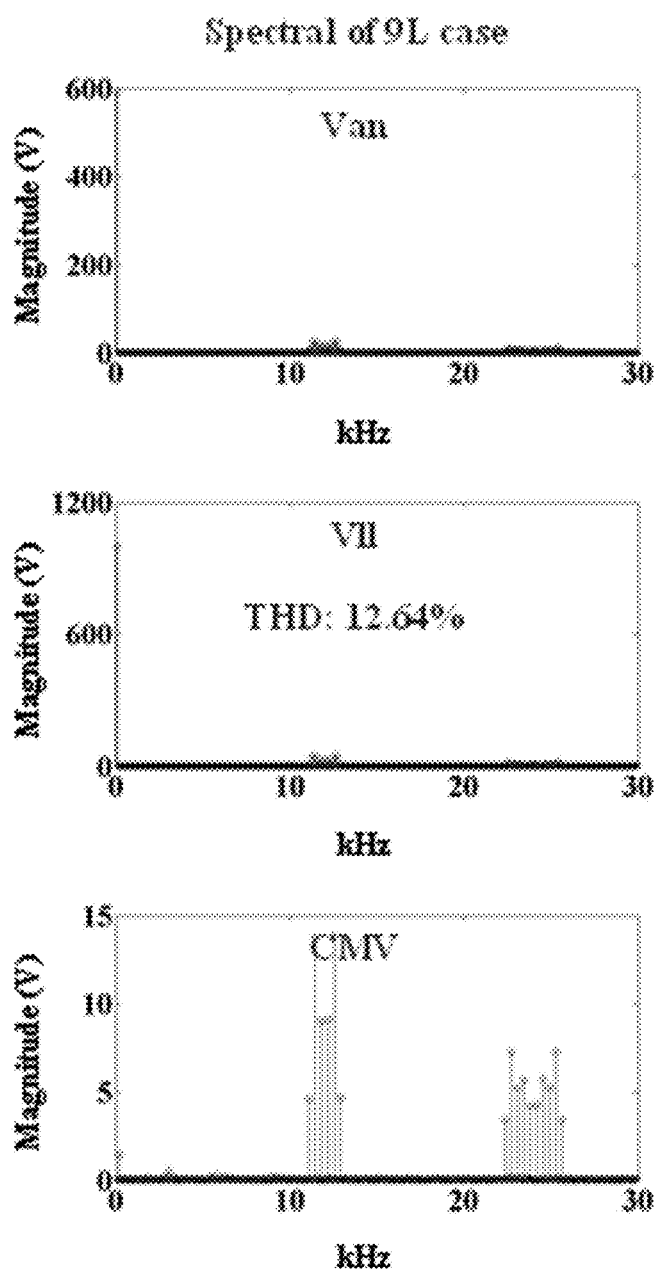
FIG. 7C is a series of graphs showing Harmonic spectral of the waveforms in an IO operation mode for FC-IP-ANPC.
Figure 8A:
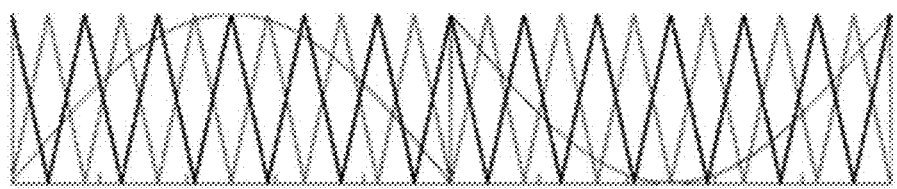
FIG. 8A is a graph showing PWM strategies of an SO mode of FC-IP-ANPC with two HSF modules.
Figure 8A:
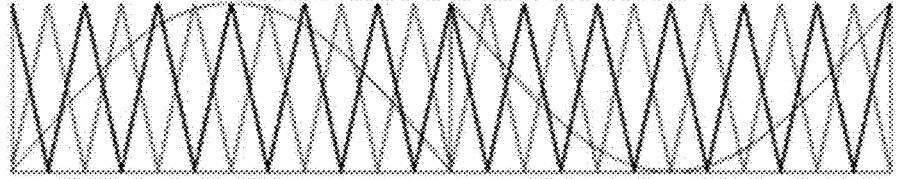
Figure 8B:
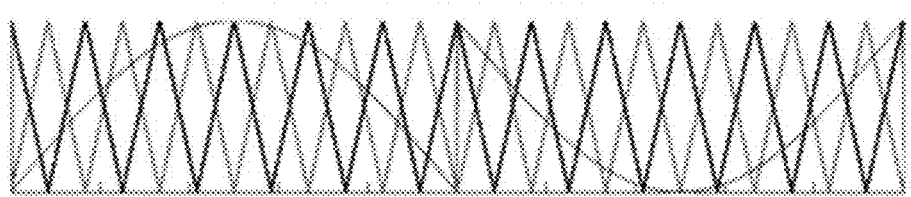
FIG. 8B is a graph showing PWM strategies of an IO mode of FC-IP-ANPC with two HSF modules.
Figure 8B:
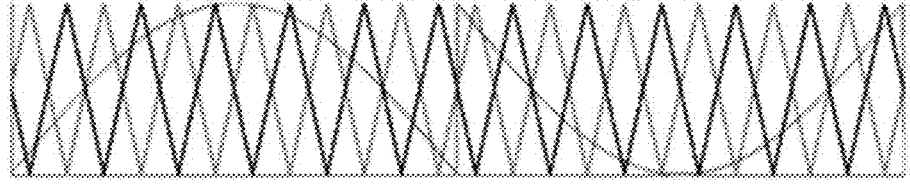
Figure 8C:
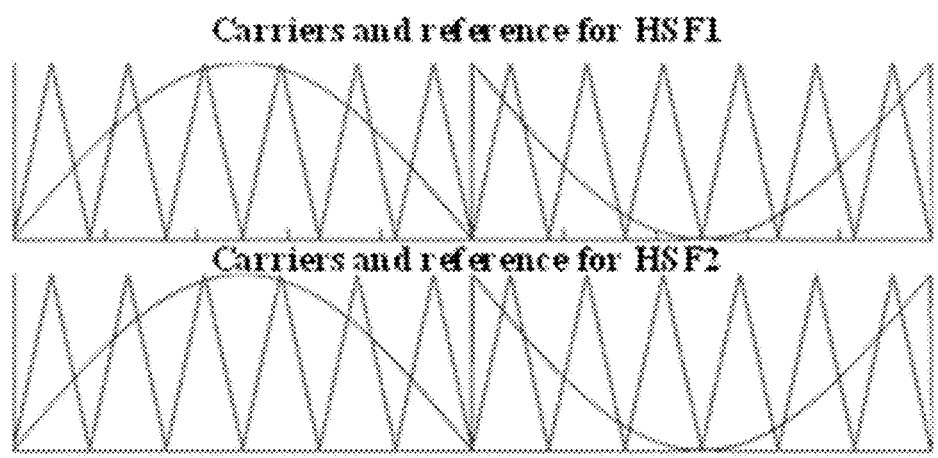
FIG. 8C is a graph showing PWM strategies of an SO mode of HB-IP-ANPC with two HSF modules.
Figure 8D:
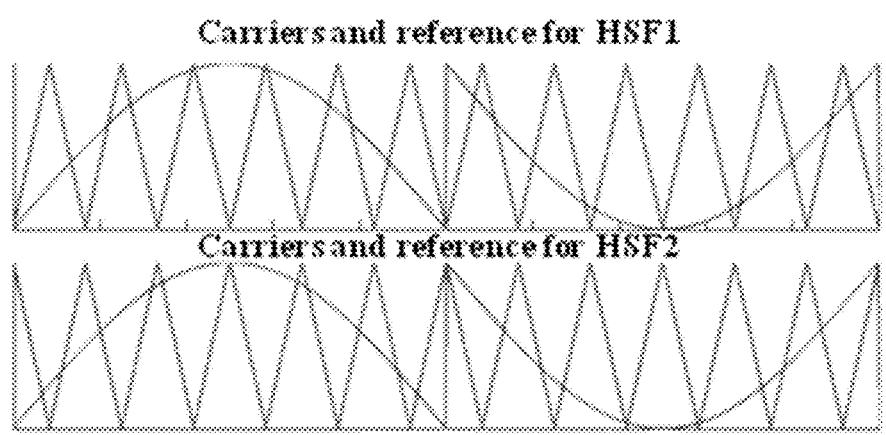
FIG. 8D is a graph showing PWM strategies of an IO mode of HB-IP-ANPC with two HSF modules.
Figure 9A:
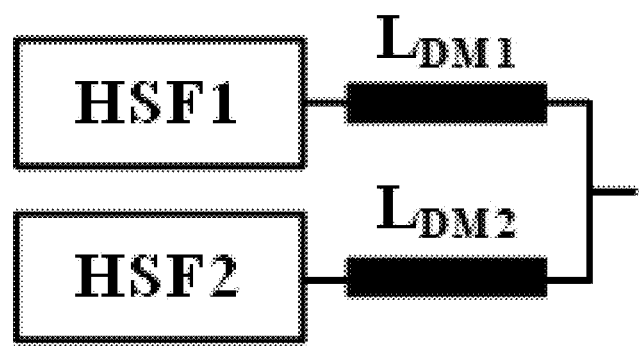
FIG. 9A shows an inductor implementation schemes in one phase with two HSF modules and two separated DM inductors.
Figure 9B:
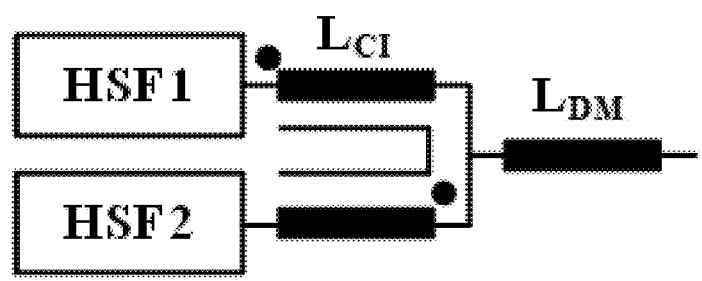
FIG. 9B shows an inductor implementation schemes in one phase with two HSF modules and one coupled inductor and one DM inductor.

As with interleaved converters, the number of output voltage levels can be increased with interleaving of the HSF modules. For example, for the FC-IP-ANPC, 9L output can be obtained if two HSF modules are interleaved, and 13L output for interleaved HSF modules. As such, the output quality can be improved. At the same time, the CMV issue is also mitigated. FIGS. 6B and 6C show the example waveforms of phase voltage and CMV with phase-shifted PWM (see FIGS. 8A and 8B) in synchronized operation (SO) and interleaved operation (10) modes, respectively, with two HSF modules. As shown, the resultant 9L CMV waveform is more desired than the 5L one. Corresponding harmonics spectral are presented in FIGS. 7B and 7C. The output voltage and CMV both contain less harmonics as compared to the non-interleaving case. The example waveforms of the HB-IP-ANPC are also presented, with FIG. 6A showing the results of SO mode and FIG. 6B showing the IO mode. The harmonic spectral of the two modes are shown in FIGS. 7A and 7B, respectively. One can see that after interleaving, the output becomes 5L and CMV is reduced. Note that the IO mode example waveforms for the HB-IP-ANPC are obtained with the modulation strategy shown in FIG. 8D. Therefore, the results are the same as the 5L case with the modulation strategy shown in FIG. 8A. Similar to the interleaved 2L converters, separated differential mode (DM) inductors or coupled-inductors can be used to suppress the circulating current. The inductor implementation schemes are shown in FIG. 9.

The flying capacitor voltage, $v_{FC}$, of the FC-IP-ANPC converter can be balanced at high frequency, naturally with phase-shift PWM or actively using the redundant switching states. Natural balancing is simple for implementation. However, according to some embodiments, a backup active balancing method is used for protection purposes when $v_{FC}$ becomes unstable or beyond set limits. There have been several active balancing approaches proposed in literature, e.g. the PI controller based method (15), space vector modulation (SVM) based (16), and cost function based (17). For high power applications, these approaches can achieve good performance, even though they are usually complicated or time-consuming. However, for FC-IP-ANPC converter, a carrier-based balancing strategy is preferred in order to simplify the coordination of the paralleled HSF modules. Particularly, when WBG devices are implemented, existing methods will significantly increase the computational burden of the control, and thus are less practical. As such, an efficient flying capacitor balancing becomes highly desirable.

To address the above challenge, the present disclosure provides a logic based flying capacitor voltage balancing scheme. The logic based method is very flexible as it can be adaptive to all kinds of PWM strategies, e.g. carrier-based, SVM, selective harmonic elimination PWM (SHE PWM), or any specially design strategy for a certain purpose (18). Its implementation in FC-IP-ANPC converter is also provided herein.

Figure 10:
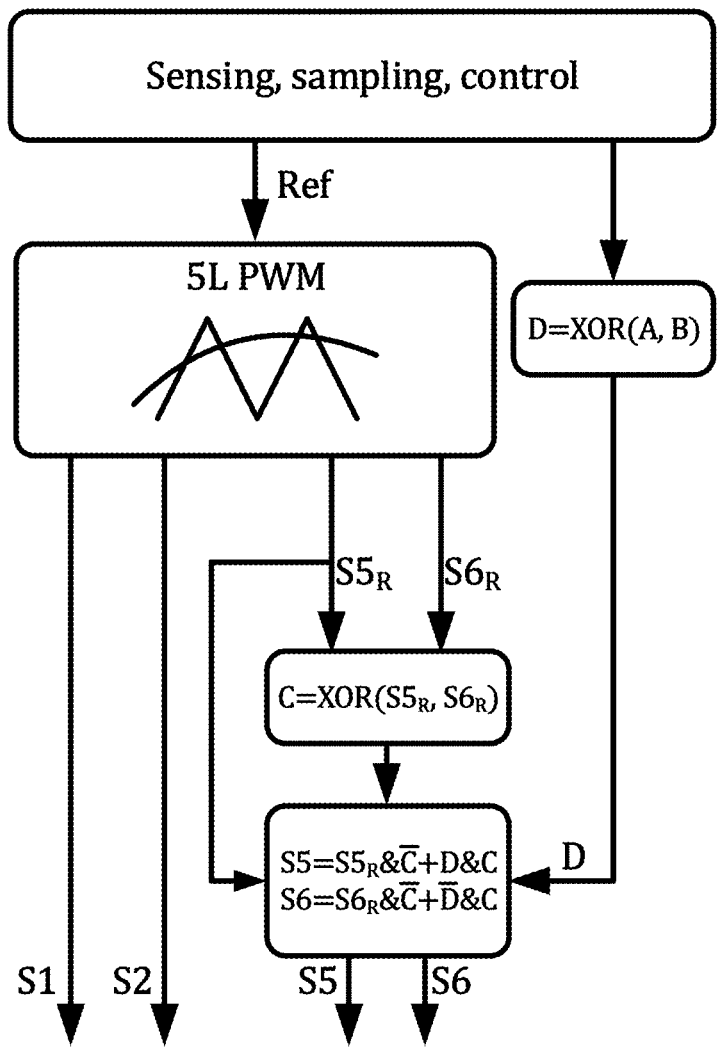
FIG. 10 is a schematic drawing showing an implementation principle of a logic based flying capacitor voltage balancing scheme according to the present disclosure.

The logic modulation scheme of the present disclosure is shown in FIG. 10, where $S5_R$ and $S6_R$ are the reference pulses when flying capacitor voltage balancing is not considered. These reference pulses are generated through various 5L PWM strategies, as aforementioned. The flying capacitor voltage and output current are measured, based on which the controller then finds out the proper pulses for switches $S_5$ and $S_6$ (FIG. 1B) to make sure the flying capacitor voltage is restrained around the reference value. In the logic based modulation, a variable A is defined as: if output current $i_O>0$, A=1; otherwise A=0. Variable B is defined as, when the flying capacitor voltage $v_{FC}>v_{REF}$, B=1, otherwise B=0. Variable D is defined as written in Equation 5. Also, to determine whether or not $v_{FC}$ should be balanced, another variable C and an Exclusive Or operation can be introduced into the calculation. When the pulses for $S5_R$ and $S6_R$ are different, C=1, which means that $v_{FC}$ balancing should be carried out. Otherwise if C=0, $v_{FC}$ balancing is not necessary. Based on this principle, the variable C can be obtained by Equation 6. After having the value of D and C, the logic equations in Equation 7 are then used to generate the PWM signals for $S_5$ and $S_6$. Table III shows the logic table when active balancing is required, i.e. C=1.

$$D = XOR(A, B) \quad \text{Equation 5:}$$

$$C = XOR(S5_R, S6_R) \quad \text{Equation 6:}$$

$$S5 = S5_R \& \overline{C} + D \& C$$

$$S6 = S6_R \& \overline{C} + \overline{D} \& C \quad \text{Equation 7:}$$

TABLE III

Logic table of the flying capacitor voltage balancing.

| C | A | B | S5 | S6 |
|---|---|---|----|----|
| 1 | 1 | 1 | 0 | 1 |
| 1 | 1 | 0 | 1 | 0 |
| 1 | 0 | 1 | 1 | 0 |
| 1 | 0 | 0 | 0 | 1 |

According to embodiments of the FC-IP-ANPC converter, the flying capacitor voltage of each HSF module in the same phase should have the same ripple waveform. However, this is usually not the case in practical applications. Particularly, for interleaved operation, the reference pulses of difference HSF modules are different. Therefore, it is necessary to measure the voltage on each flying capacitor and balance them individually.

Experimental Results

Figure 11A:
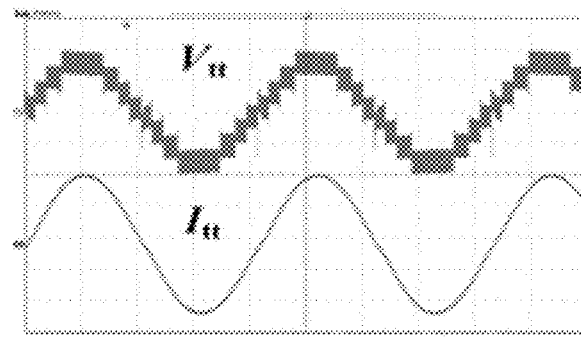
FIG. 11A is a graph showing total output voltage and output current of FC-IP-ANPC in an IO operation mode.
Figure 11B:
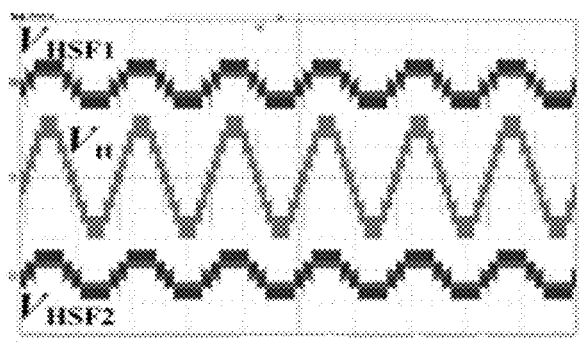
FIG. 11B is a graph showing output voltage of each HSF module and the total output voltage of FC-IP-ANPC in an IO operation mode.
Figure 11C:
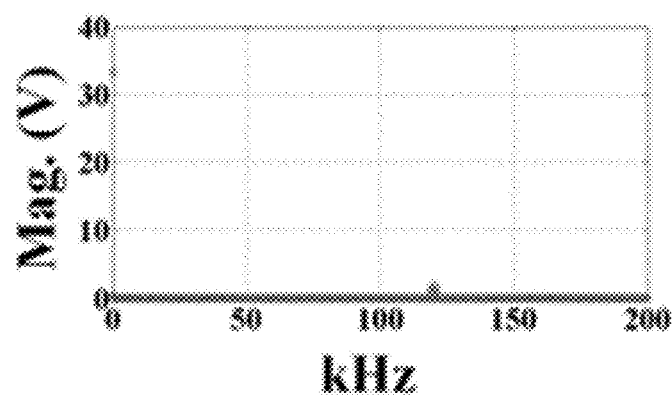
FIG. 11C is a graph showing harmonic spectrum of the total output voltage of FC-IP-ANPC in an IO operation mode.
Figure 12A:
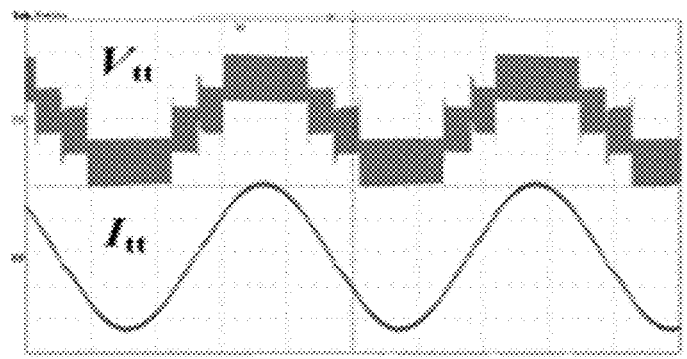
FIG. 12A is a graph showing total output voltage and output current of HB-IP-ANPC in an IO operation mode.
Figure 12B:
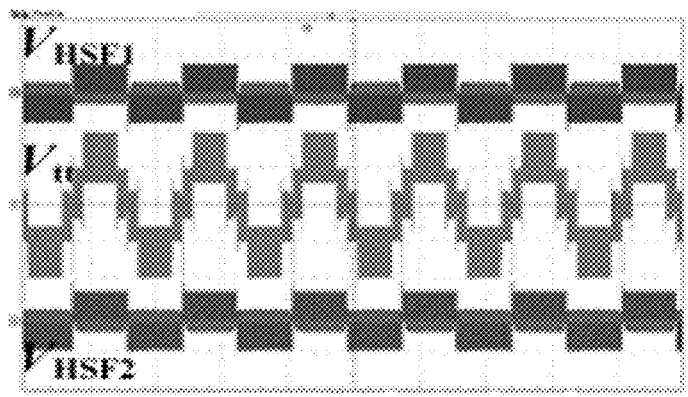
FIG. 12B is a graph showing output voltage of each HSF module and the total output voltage of HB-IP-ANPC in an IO operation mode.
Figure 12C:
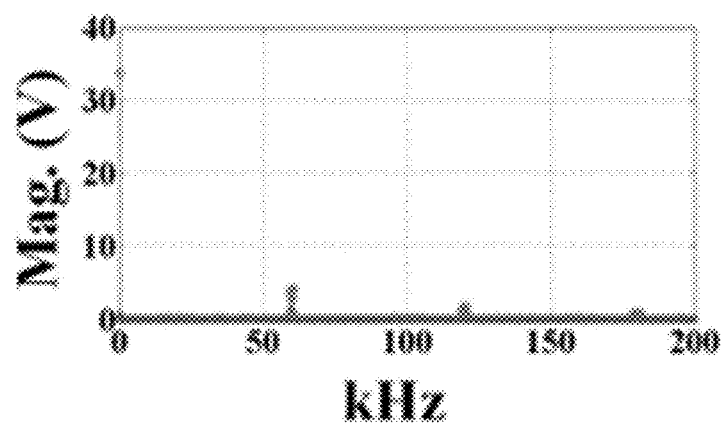
FIG. 12C is a graph showing harmonic spectrum of the total output voltage of HB-IP-ANPC in an IO operation mode.

Experimental results are obtained with a low voltage proof-of-concept single phase-leg prototype. The LSF part is built with discrete Si IGBT and switches at 60 Hz. The HSF modules are built with GaN HEMT and switch at 30 kHz. The DC link voltage is 80V. The flying capacitor is built with film capacitor with 50 uF. The current sharing inductor is 2.5 mH and the load is 6.5Ω. The modulation index is 0.9. The waveforms and corresponding spectral of FC-IP-ANPC are shown in FIGS. 11A-11C with IO mode only. The waveforms and harmonic spectral of HB-IP-ANPC are shown in FIGS. 12A-12C with IO mode only. In the figures, $V_{tt}$ stands for the total output voltage (20V/div), $I_{tt}$ means the total output current (2.5 A/div), $V_{HSF1}$ and $V_{HSF2}$ are the output voltage of HSF1 module and HSF2 module, respectively (50V/div).

As shown in FIGS. 11A-11C, the output voltage of each HSF module is 5L, whereas the total output voltage becomes 9L due to interleaving. As shown in FIG. 11C, the lowest high frequency harmonics are around 120 kHz, which is four times of the switching frequency, i.e. 30 kHz. For the results of HB-IP-ANPC, one can see that the output voltage is 5L after interleaving, whereas the output voltage of each HSF module is 3L. The effective switching frequency is 60 kHz due to interleaving. The total output voltage THD values are 19.52% and 36.65% for FC-IP-ANPC and HB-IP-ANPC, respectively.

Figure 13:
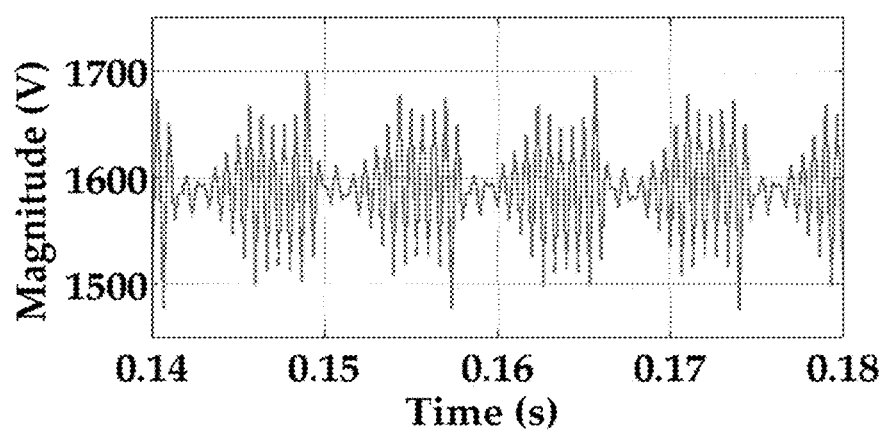
FIG. 13 is a graph showing a waveform of simulated flying capacitor voltage with balancing based on embodiments of the present invention.

The waveform of flying capacitor voltage under the inventive logic based modulation is shown in FIG. 13. One can see that the flying capacitor voltage is well controlled around the reference value.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

CITED REFERENCES

[1] S. Kouro et al., "Recent Advances and Industrial Applications of Multilevel Converters," IEEE Trans. Ind. Electron., vol. 57, no. 8, pp. 2553-2580, August 2010.

[2] J. Rodriguez, S. Bernet, B. Wu, J. O. Pontt and S. Kouro, "Multilevel Voltage-Source-Converter Topologies for Industrial Medium-Voltage Drives," IEEE Trans. Ind. Electron., vol. 54, no. 6, pp. 2930-2945, December 2007.

[3] M. A. Perez, S. Bernet, J. Rodriguez, S. Kouro and R. Lizana, "Circuit Topologies, Modeling, Control Schemes, and Applications of Modular Multilevel Converters," IEEE Trans. Power Electron., vol. 30, no. 1, pp. 4-17, January 2015.

[4] P. Barbosa, P. Steimer, J. Steinke, M. Winkelnkemper and N. Celanovic, "Active-neutral-point-clamped (ANPC) multilevel converter technology," 2005 European Conference on Power Electronics and Applications, Dresden, 2005, pp. 10 pp.-P. 10.

[5] ABB, Converter circuit for switching a large number of switching voltage levels, U.S. Pat. No. 7,292,460 B2

[6] F. Ueda, K. Matsui, M. Asao, K. Tsuboi, "Parallel-connections of pulsewidth modulated inverters using current sharing reactors", IEEE Trans. Power Electron., vol. 10, no. 6, pp. 673-679, November 1995.

[7] Z. Quan; Y. Li, "Suppressing Zero-Sequence Circulating Current of Modular Interleaved Three-Phase Converters Using Carrier Phase Shift PWM," IEEE Trans. Ind. Appl., in press, 2017.

[8] Z. Quan, Y. W. Li, "A Three-Level Space Vector Modulation Scheme for Paralleled Converters to Reduce Circulating Current and Common-Mode Voltage," IEEE Trans. Power Electron., vol. 32, no. 1, pp. 703-714, January 2017

[9] Z. Quan, Y. Li, "Impact of carrier phase shift PWM on the DC link current of single and interleaved three-phase voltage source converters", ECCE 2017.

[10] Z. Quan, Y. Li, "Harmonic Analysis of Interleaved Voltage Source Converters and Tri-Carrier PWM Strategies for Three-Level Converters", COMPEL 2017.

[11] J. Li, S. Bhattacharya and A. Q. Huang, "A New Nine-Level Active NPC (ANPC) Converter for Grid Connection of Large Wind Turbines for Distributed Generation," IEEE Trans. Power Electron., vol. 26, no. 3, pp. 961-972, March 2011.

[12] M. Kasper, D. Bortis and J. W. Kolar, "Scaling and balancing of multi-cell converters," 2014 International Power Electronics Conference (IPEC-Hiroshima 2014—ECCE ASIA), Hiroshima, 2014, pp. 2079-2086.

[13] F. Richardeau and T. T. L. Pham, "Reliability Calculation of Multilevel Converters: Theory and Applications," IEEE Trans. Ind. Electron., vol. 60, no. 10, pp. 4225-4233, October 2013.

[14] J. W. Kolar, et al., Impact of Magnetics on Power Electronics Converter Performance—State-of-the-Art and Future Prospects, Keynote Presentation at the PSMA Workshop on "Power Magnetics @ High Frequency—Transforming the Black Magic to Engineering", Tampa, USA, Mar. 25, 2017.

[15] M. Khazraei, H. Sepahvand, K. A. Corzine and M. Ferdowsi, "Active Capacitor Voltage Balancing in Single-Phase Flying-Capacitor Multilevel Power Converters," IEEE Trans. Ind. Electron., vol. 59, no. 2, pp. 769-778, February 2012.

[16] S. Choi and M. Saeedifard, "Capacitor Voltage Balancing of Flying Capacitor Multilevel Converters by Space Vector PWM," IEEE Trans. Power Del., vol. 27, no. 3, pp. 1154-1161, July 2012.

[17] A. M. Y. M. Ghias, J. Pou and V. G. Agelidis, "Voltage-Balancing Method for Stacked Multicell Converters Using Phase-Disposition PWM," IEEE Trans. Ind. Electron., vol. 62, no. 7, pp. 4001-4010, July 2015.

[18] A. K. Sadigh, V. Dargahi and K. A. Corzine, "New Active Capacitor Voltage Balancing Method for Flying Capacitor Multicell Converter Based on Logic-Form-Equations," IEEE Trans. Ind. Electron., vol. 64, no. 5, pp. 3467-3478, May 2017.

The invention claimed is:

1. An internal parallelization based single stage active neutral point clamped (IP-ANPC) converter for single-phase or multiple phases AC-DC or DC-AC power conversion, wherein a phase consists of:
a low switching frequency (LSF) part; and
a plurality of high switching frequency (HSF) modules, wherein the plurality of HSF modules are modular, connected in parallel to a single output terminal, connected in parallel to the LSF part without a DC link capacitor between the LSF part and the HSF modules, and are modulated independently from each other and independently from the LSF part.

2. The IP-ANPC converter of claim 1 wherein each HSF module of the plurality of HSF modules includes a current sharing inductor.

3. The IP-ANPC converter of claim 1 further comprising an output filter.

4. The IP-ANPC converter of claim 1 wherein each HSF module of the plurality of HSF modules has a flying capacitor.

5. The IP-ANPC converter of claim 4 wherein the HSF modules are synchronized, and the output voltage has at least 5 voltage levels.

6. The IP-ANPC converter of claim 4 wherein voltage of the flying capacitors is balanced at high frequency with phase shift pulse width modulation (PWM).

7. The IP-ANPC converter of claim 4 wherein voltage of the flying capacitors is balanced at high frequency with redundant switching states.

8. The IP-ANPC converter of claim 1 wherein each HSF module of the plurality of HSF modules is a half bridge HSF module.

9. The IP-ANPC converter of claim 1 wherein the LSF part is a silicon (Si) power semiconductor device.

10. The IP-ANPC converter of claim 1 wherein each of the HSF modules of the plurality of HSF modules is a Wide Band Gap (WBG) device.

11. The IP-ANPC converter of claim 1 wherein each of the HSF modules of the plurality of HSF modules is a high-switching Si power semiconductor device.

12. The IP-ANPC converter of claim 1 wherein the IP-ANPC converter is modular.

13. The IP-ANPC converter of claim 1 wherein each of the HSF modules of the plurality of HSF modules are configured to use partial power.

14. The IP-ANPC converter of claim 1 wherein the plurality of HSF modules are interleaved.

15. The IP-ANPC converter of claim 1 wherein voltage of the converter is balanced naturally with phase shift PMW.

16. The IP-ANPC converter of claim 15 wherein voltage of the converter is redundantly balanced with redundant switching states.

17. The IP-ANPC converter of claim 1 wherein the LSF part is configured to switch at a fundamental switching frequency.

18. The IP-ANPC converter of claim 17 wherein the fundamental switching frequency is an AC voltage frequency.

19. The IP-ANPC converter of claim 1 wherein the HSF modules are configured to switch at a switching frequency higher than fundamental frequency.

20. The IP-ANPC converter of claim 1 wherein the HSF modules in one converter are switched at the same or different switching frequencies.

* * * * *